United States Patent [19]

La Fratta

[11] Patent Number: 5,758,283
[45] Date of Patent: May 26, 1998

[54] METHOD AND APPARATUS FOR LOCATING MOBILE RADIO UNITS IN A MULTISITE RADIO SYSTEM

[75] Inventor: Laurence A. La Fratta, Lynchburg, Va.

[73] Assignee: Ericsson Inc., Research Triangle Park, N.C.

[21] Appl. No.: 584,295

[22] Filed: Jan. 11, 1996

[51] Int. Cl.⁶ ................................................ H04Q 7/00
[52] U.S. Cl. ......................... 455/435; 455/520; 455/524
[58] Field of Search ........................ 455/33.1, 34.1, 455/34.2, 53.1, 54.1, 54.2, 56.1, 57.1, 433, 435, 456, 457, 458, 520, 524, 525

[56] References Cited

U.S. PATENT DOCUMENTS

| | | |
|---|---|---|
| 5,212,724 | 5/1993 | Nazarenko et al. |
| 5,247,698 | 9/1993 | Sawyer et al. ........................ 455/34.1 |
| 5,369,681 | 11/1994 | Boudreau et al. ..................... 455/33.1 |
| 5,392,278 | 2/1995 | Teel et al. |
| 5,493,696 | 2/1996 | Wolf. |
| 5,561,840 | 10/1996 | Alvesalo et al. ...................... 455/54.2 |
| 5,564,071 | 10/1996 | Liou et al. ............................. 455/56.1 |

FOREIGN PATENT DOCUMENTS 2 246 053   1/1992   United Kingdom.

WO 91 13522 A   9/1991   WIPO.

*Primary Examiner*—Reinhard J. Eisenzopf
*Assistant Examiner*—Lester G. Kincaid
*Attorney, Agent, or Firm*—Nixon & Vanderhye P.C.

[57] ABSTRACT

In a digitally trunked radio repeating system that includes several radio repeating transceiver sites linked by a multisite switch, a method for locating a mobile radio when two or more of the sites report having the mobile radio in their site area. When a site reports to the multisite switch that a mobile radio has newly entered the area for the site, the switch broadcasts communications from the mobile radio to two or more sites during a prescribed period of time. If no other site reports receiving a message from the mobile radio during the prescribed period, the radio is logged out of its former site and broadcasts to the radio are only made from the new site. If two or more sites report having the mobile radio in their areas within the prescribed period, a polling method is executed where each of the sites reporting messages from the mobile radio transmits in sequence a command for the mobile radio to respond. The site that first receives a response from the mobile radio to its polling message will log the mobile radio into its site. The mobile radio is then logged out of all other sites.

8 Claims, 4 Drawing Sheets

MULTI-SITE ARCHITECTURE

METHOD AND APPARATUS FOR LOCATING MOBILE RADIO UNITS IN A MULTISITE RADIO SYSTEM

FIELD OF THE INVENTION

This invention relates to trunked radio frequency (RF) communications where mobile radios roam between trunked RF communication sites over a wide area. In particular, the invention relates to a technique for identifying the repeater radio site in current communication with a particular mobile radio.

BACKGROUND OF THE INVENTION

The invention relates to a multisite network of several single radio frequency (RF) broadcast site systems. Digital trunked radio transceivers capable of handling communications between numerous mobile units and dispatcher consoles in a single geographic area are known. Trunked RF repeater systems are used, for example, by public service organizations, such as police, fire and rescue departments, taxi services and commercial delivery fleets. These RF repeater systems permit a relatively-limited number of RF communications channels to be shared by a large number of users—while providing relative privacy to any particular RF communication (conversation). Typical state-of-the-art RF repeater systems are "digitally trunked" and use digital signals of voice, data and/or radio control messages conveyed over the RF channels (in conjunction with digital control elements connected in the system) to accomplish "trunking" (time-sharing) of the limited number of RF channels among a large number of users.

A multisite switch links several individual RF repeater site systems to form a wide-area network in which radio users in one site area can communicate with users in another site area. In a multisite network, a single communication (voice and/or data) is received from an individual mobile radio unit by an RF repeater site (or from a dispatcher console) and the site conveys the communication to the multisite switch. The switch routes the communication to the various dispatcher consoles and RF repeater sites having one or more radio units within their site areas participating in the call and the same communication is substantially simultaneously transmitted from these various RF repeater sites to the participating radio units. A communication is only transmitted from those RF repeater sites having the mobile radio unit(s) participating in the communication. If a repeater site has no participating radio unit in its area, then the communication is not broadcast from that repeater site. For the multisite switch to properly route communications, the switch and/or RF repeater sites must be knowledgeable of the current RF repeater site area for each mobile radio unit in the multisite network.

Each site repeating station maintains a log of the mobile units currently operating within the site area covered by the station. This log enables to the site to select which multisite messages and calls (collectively referred to as communications) that are to be transmitted from its repeating station. The log of mobile units in the site's area also enables the site controller and/or multisite switch to filter out messages and calls circulating through the multisite switch that have no participating radio units in the site area for that particular site.

The log of current mobile units is updated as a mobile unit enters the site area for a particular RF repeater site system. A radio unit leaves a site area when the radio loses reception of the RF control channel for the RF site system and a radio unit enters a new site area when the radio latches onto the RF control channel being transmitted from the new RF repeater site. Each RF repeater station has a control channel on which site identification messages are regularly broadcast. The control channel is also used for certain digital control messages, such as a working channel request and working channel assignment messages.

As a mobile radio unit moves from one radio repeater site to another, the unit loses reception of the control channel from the first site station and then scans for another control channel until it latches onto the control channel transmissions of a second site. When it latches onto a new control channel and receives a site ID message on that channel, the mobile radio units log in with a new RF site repeater station (second site) by sending a login message on the control channel to the new site repeater station. Upon receipt of a login message, the second site repeater station updates its log list of current mobile units in its site area with information regarding the new mobile unit and sends a message to the multisite switch to notify the switch of the new logged-in mobile radio unit.

The multisite switch has a node for each site repeater station that also maintains lists of the mobile units logged into the corresponding site and the number of members of each radio group logged into the site. For each login message received from a site controller, the multisite switch sends a logoff message that causes the mobile radio unit referenced in the login message to be logged out of all other nodes and, thus, the site radio repeater in which the unit was previously logged is notified to log out the radio unit because the unit has logged into a new site. Accordingly, the last login message for a particular mobile radio unit from any site repeater station causes that same mobile unit to be logged out of all other repeater stations.

Prior to the current invention, problems had arisen when mobile units were inadvertently logged into the wrong repeater site and, consequentially, the units were logged out of the repeater sites in which the units were actually operating within. Accordingly, on rare occasions, the multisite network has a mobile radio unit logged into the wrong RF repeater site station. If a mobile radio unit is logged into the wrong site, then the unit may not receive communications intended for that unit because the repeater station nearest mobile unit will not broadcast the call.

The problem of mobile radio units becoming logged into the wrong repeater site most often occurs (albeit rarely) when a transmission from a mobile radio unit is inadvertently received on a control channel of a neighboring radio repeater site. For example, a working channel request message transmitted from a mobile radio unit may be inadvertently received by a second site as a working channel request and cause the second site to log the mobile radio into its site area. The sharing of a limited number of radio channels between individual repeater sites in a multisite network gives rise to problems that occur when transmissions from one site are received and misinterpreted by a receiver in another site. For example, a transmission from a mobile radio unit in one site area and intended for the repeating site station in that site may be inadvertently received by the repeating station at an adjacent site. While the adjacent site should not receive or act on a transmission from a mobile unit in another site, on rare occasions adjacent sites have improperly interpreted such remote transmissions as legitimate transmissions from their own site area. A transmission from a mobile unit processed by a wrong site repeating station may cause the station to incorrectly log the mobile unit as having entered its site area when the mobile unit is still in its original site area.

By way of background, each digitally-trunked RF communications site station includes a "control" RF channel and multiple "working" RF channels. The working channels are used to carry actual communications traffic, e.g., analog FM, digitized voice, digital data, etc. The RF control channel is used to carry digital control signals between the repeater sites and user RF transceivers (radio units) in the field. The frequency bands assigned as working channels and the control channel varies from site to site. When a user's transceiver is not actively engaged in a conversation, it monitors the control channel for the site to which it is currently assigned for "outbound" digital control messages directed to it. User depression of a push-to-talk (PTT) switch results in a digital channel request message sent on the control channel requesting a working channel (and specifying one or a group of callees) to be transmitted "inbound" over the RF control channel to the repeater site.

The repeater site (and associated trunking system) receives and processes the channel request message. Assuming a working channel is available, the repeater site generates and transmits a responsive "outbound" channel assignment digital message over the RF control channel. This message temporarily assigns the available working channel for use by the requesting transceiver and other callee transceivers specified by the channel request message. The channel assignment message automatically directs the requesting (calling) transceiver and callee transceivers to the available RF working channel for a communications exchange. The control channel is thereafter not used during the communication. Accordingly, the control channel is used to request and assign working channels, and to transmit certain emergency messages.

When the communication terminates, the transceivers "release" the temporarily assigned working channel and return to monitoring the RF control channel. The working channel is available for reassignment to the same or different user transceivers via further messages conveyed over the RF control channel. An exemplary "single site" trunked RF repeater system is disclosed in commonly-assigned U.S. Pat. Nos. 4,905,302 and 4,903,321, which are incorporated by reference in their entireties.

Single site trunked RF repeater systems may have an effective coverage area of tens of square miles (if the area is free of obstructions) or only a few city blocks (if large buildings obstruct the broadcast coverage of the site and mobile radio units). A single site may include one or more satellite receiving stations, e.g., repeating stations, and a single high power transmitting site if a somewhat larger coverage area is desired. However, the coverage of a single site is often inadequate to reach the broadcast area of some governmental entities and other public service trunking system users that require an RF communications coverage area of hundreds of square miles or of an entire city. To provide large coverage areas, it is necessary to provide multiple RF repeater sites and to automatically coordinate all sites so that a radio transceiver located anywhere in the system coverage area may efficiently communicate in a trunked manner with other radio transceivers located anywhere in the system coverage area.

The control channel of a site may be used when mobile radio units leave one site area and enter an adjacent site area. As a mobile unit roams from one site to another, the mobile radio's reception of the control channel in the first site weakens to such an extent that the radio automatically scans for a second site's control channel. When the control channel for the second site is received, the radio unit sends a log-in message to the second site repeater which logs the new unit into its site and advises the first site, via a multisite network switch, that the unit is to be logged off the first site.

FIG. 1 is a schematic diagram of a simplified exemplary multiple-site trunked radio repeater system, e.g., a multisite system, having three radio repeater (transmitting/receiving) sites S1, S2, and S3 providing RF communications to geographic areas A1, A2, and A3, respectively. Mobile or portable transceivers within area A1 transmit signals to and receive signals from site S1; transceivers within area A2 transmit signals to and receive signals transmitted by site S2; and transceivers within area A3 transmit signals to and receive signals transmitted by site S3. Each repeater site S1, S2, S3 includes a set of repeating transceivers operating on a control channel and plural RF working channels. Each site typically has a site controller (e.g., a digital computer) that acts as a central point for communications in the site, and is capable of functioning relatively autonomously if all participants of a call are located within its associated coverage area.

To enable communications from one area to another a switching network, a "multisite switch" may be provided to establish audio and control signal pathways between repeaters of different sites. These pathways are set up at the beginning of each call and taken down at the end of each call. For example, the site controller (S1) receives a call from a mobile radio in A1 requesting a channel to communicate with a specific callee. A caller requests a channel simply by pressing the push-to-talk (PTT) button on his microphone. This informs the site controller S1 via an "inbound" digital control message transmitted over the RF control channel that a working or audio channel is requested. The site controller assigns a channel to the call and instructs the caller's radio unit to switch from the control channel to the channel (audio or data) assigned to the call. This assigned working channel is applicable only within the area covered by that site and is used as a communication channel only for mobile units within the site.

In a multisite radio system, when a site controller assigns a working channel for a mobile unit in its site area, the site controller also sends a channel request message to the multisite switch (200). The multisite switch sends the channel request to other site controllers having a designated callee within their site area. Audio and data signals are routed through the multisite switch such that audio/data pathways are created to serve one or more callees and one or more dispatcher consoles 202 involved in the communication. Upon receiving a channel request, these "secondary" site controllers (secondary in the sense they did not originate the call) assign an RF secondary working channel to the call for each respective site. Each secondary working channel is generally a different frequency band and is operative only in the site area covered by the secondary site controller. The secondary site controller(s) also sends the channel assignment back up to the multisite switch so that the switch can track which sites are participating in each active call.

A caller can communicate with a radio unit or group of radio units in another area via the multisite switch. The call is initially transmitted to the primary site repeater, routed through an assigned audio slot in the multisite switch to secondary site repeaters, and retransmitted by the secondary sites on various assigned channels in those other areas. When the call ends, the primary site controller deactivates the assigned channel for that site and notifies multisite switch 200 that the call is terminated. The multisite switch propagates an end of call command ("channel drop") to all other site controllers. This releases all working channels assigned to the call and breaks the associated audio routing pathways.

The multisite switch preferably includes a distributed control architecture. The logical functions and computational workload of the multisite switch are shared by various distributed microprocessor "nodes". Each node is connected either to a site controller 102, dispatch console 202, public and/or private landline telephone exchanges and other components of the particular communications system. Most nodes function as switch interfaces and include, for example, Master Interface Modules (MIMs) for nodes coupled to site controllers and Console Interface Modules (CIMs) for nodes coupled to dispatch consoles. Each interface module is supported by a controller card that utilizes several microprocessors. All of the card s have substantially the same hardware and are interchangeable. Each card acts as a gateway interface into the distributed control switch network. Detailed description and operation of such a distributed multisite switch is set forth in commonly assigned U.S. Pat. No. 5,200,954 to Teel, Jr. et al which is also incorporated herein by reference in its entirety.

In addition, two or more multisite switches may be linked to form a wide-area multisite system having a relatively-large wide-area covered by a single RF trunked system. As the number of sites in a multisite (or wide area) network increases, the amount of sharing increases of the limited number of channels assigned to that system. While it is preferable that a multisite network not have two sites with overlapping broadcast areas that share the same channel frequencies, such sharing of channel frequencies between adjacent sites may occur. Similarly, a mobile unit assigned to one site may, in certain circumstances (such as when transmitting from a hill on the edge of a site area and in optimum transmission weather conditions) transmit a message, e.g., a working channel request message, that is received by another site that is normally out of range of radio units in that site. Accordingly, there has been a long-felt problem associated with transmissions in one site area being received by a site repeater in another site.

To avoid having transmissions 108, 110 inadvertently received by unintended sites, the site repeating radios were previously geographically isolated to minimize overlapping radio coverage between the sites. Because of graphic isolation, a transmission from one site would not be received on the control channel of another site. Isolation of sites is not always geographically practical as some overlap in radio broadcast coverage almost always occurs in a multisite system. Similarly, another conventional method to avoid having a site repeater radio act on a transmission from another site was to modify the transmission protocols used by the mobile units. Adding site identification information to the transmission protocols usually increases the signalling overhead associated with the transmission (and thereby reduces the available time for transmission of voice or other information) and requires relatively extensive modification of the messaging protocols used by the radios in a multisite network. In addition, most of the site identification protocols increase the difficulty in adapting a message protocol that allows a mobile site to roam from site to site. Moreover, intermodulation of transmissions can generate signals received on another channel in the same site station that can cause problems of transmissions being received and processed on the wrong channel.

SUMMARY OF INVENTION

In the prior art, mobile radio units on rare occasions were inadvertently logging into wrong RF repeater sites which were remote from the mobile radio. For example, when a working channel request message is transmitted from a mobile radio unit is inadvertently received and processed on a control channel of an unintended RF repeater site, that mobile radio unit may be unintentionally logged into that unintended repeater site. When the unintended repeater site logs in the mobile radio unit, the site sends a login message to the multisite site switch which in turn sends logoff messages to all other sites, including the site that actually has the mobile unit within its area. Accordingly, the mobile radio unit is logged out of the site from which the radio is actually receiving communications, and is logged into another site that is not in reliable radio communication with the mobile radio unit. The net result is that a mobile radio is logged into a remote site and may not be able to participate in communications with the multisite network.

The present invention solves the problem of mobile radios being inadvertently logging into a remote site and being logged out of the site in which area the radio is located by polling mobile radios to identify the site area in which they are operating. A mobile radio unit is polled by transmitting a series poll message from different site stations until the mobile radio transmits a message in response to one of the poll messages, which message is received by the site repeater station. The site repeater station receiving the responsive poll message is then the site in which the mobile unit is logged and the mobile unit is logged out of all other site stations.

Mobile radios may be polled to determine their proper site location at any time. For example, the multisite network may send out polling messages to all mobile radios on a regular basis or only when the communication traffic passing through the switch is below some threshold level. These techniques of polling all mobile units will identify and correct instances where a mobile radio unit is logged into a site station which is not in actual communication with the radio. However, the message traffic added to the multisite network by sending one or more polling messages for each mobile radio could tax the capacity of the network to handle actual voice/data communications and other control message traffic. Accordingly, polling of mobile radio units has in the past been rejected as a means to confirm the location of radios.

A feature of the current invention is that polling messages are issued only when a mobile radio attempts to log into multiple sites. When a site repeater station anywhere in a multisite system receives a login message from a mobile radio that was not previously logged into that site, the site sends a login message identifying that mobile radio to the multisite switch. Upon receipt of a login message, the switch waits a prescribed time for another login message from another site for that same mobile radio. In most instances, a second login message will not be received and the switch will send a message to the site receiving the one log in message to log the mobile radio unit into that site. The switch also sends a logoff message to any other site into which the radio is also logged to cause those other sites to logout the radio.

If the multisite switch receives a second (or third, fourth, etc.) login message for the same mobile radio within the prescribed time, the switch sends a poll message to each of the sites that received a logon message for the same mobile radio. The poll message may be specifically tailored to poll mobile radios or may be an existing control message, such as a radio enable message, that upon receipt causes a mobile radio to respond with a transmitted message. The multisite switch sequentially sends a poll message to each of the site repeater stations having received a logon message from the same mobile radio. As each site repeater station transmits a poll message, the station and multisite switch briefly waits for a response from the mobile radio. When the mobile radio responds to a poll message, the radio is logged into the site which transmitted the poll message and received the response from the mobile radio.

If a site other than the site transmitting the poll message receives a response from the mobile radio, the response is ignored because the radio is communicating with the wrong site. The other site that received the poll message will likely, in its turn, transmit its own poll message to which the radio will respond. At that time, the mobile radio will be logged into that site.

Once a mobile radio responds to a poll message from a particular site repeater station, the multisite switch stops sending further poll messages to other sites. In addition, the site in which the mobile radio has logged into sends a login message to the site controller to the multisite switch and the switch, in turn, sends a logoff message to other sites on which the mobile radio may still be logged. Thereafter, the mobile radio is logged into a site with which it is in communication and communications through the multisite switch will continue as usual with the mobile radio in full participation.

BRIEF DESCRIPTION OF THE DRAWINGS

The objectives, advantages and features of the invention will become more apparent from the following description that includes the accompanying drawings and detailed written description. In the drawings.

DETAILED DESCRIPTION OF THE DRAWINGS

Figure 1:
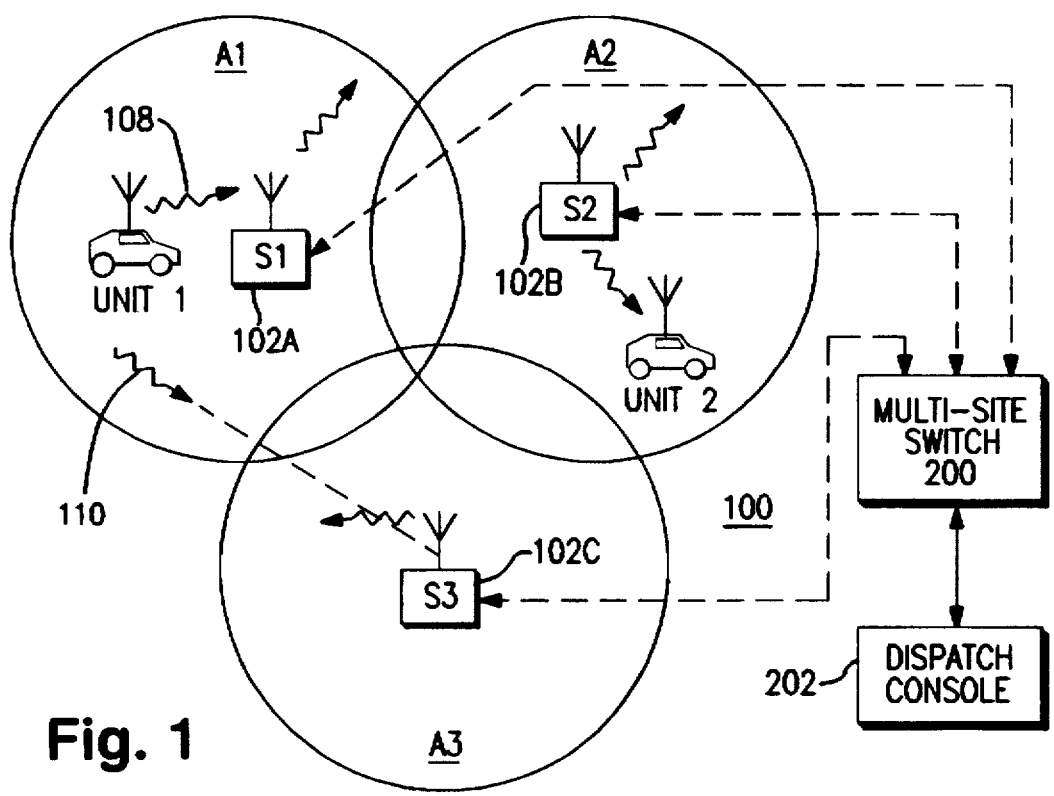
FIG. 1 is a diagram illustrating an exemplary three site multisite network, which may embody the present invention.

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so as not to obscure the description of the present invention with unnecessary detail.

An exemplary trunked radio repeater system 100 is generally depicted and was described above in conjunction with in FIG. 1. In the preferred multisite system 100, for example, the site controller (S1) receives a call from a mobile radio in coverage area A1 requesting a channel to communicate with a specific callee or group of callees. The caller requests the channel simply by pressing the push-to-talk (PTT) button on the microphone of his remote RF transceiver. This informs the site controller via an "inbound" digital control message transmitted over its assigned RF control channel that an audio working channel is needed. The site controller assigns a working channel to the call and instructs the caller's radio unit to switch from the control channel to the assigned working channel.

This assigned working channel is ready to support communications within the area covered by the site. The transmissions may be of voice, data or control message information. Generally transmissions 108 from a mobile unit, e.g., UNIT 1, are received by its local site repeater 102A. However, a transmission 110 from a mobile unit or even from a site repeater 102A that rebroadcasts some mobile unit transmissions and dispatcher transmissions may be received by another site repeater/controller, e.g., 102C. If that errant transmission 110 is received on the control channel of the other site repeater/controller, then the transmission may be incorrectly interpreted by that site controller as a control message, e.g., a mobile radio log-in message. Similarly, a transmission(s) on one channel from a site may be received on another channel at that site by way of interference or intermodulation. Such interference and intermodulation usually arises only when two or more repeater transceivers are located closely together and a transmission from one transceiver bleeds over to another transceiver.

In addition, the site controller sends a message indicating the channel request/working channel assignment to multisite switch 200. The switch, in turn, sends a channel request to all other site controllers and routes audio/data signals such that an audio/data signal pathway is created through the switch between the RF site repeater servicing the caller and the RF site repeater(s) servicing the callee(s). Additional audio signal pathways may be also established in similar fashion such that one or more dispatch consoles 202 may become involved in the communication with the mobile radio(s). Upon receiving a channel request message from the multisite switch, these "secondary" site controllers each assign an RF working channel to the call (e.g., if a callee designated by the caller's channel request message happens to be physically located within the coverage area serviced by the associated RF transceiving site). Meanwhile, multisite switch 200 ensures that the caller's audio has been routed from the active RF receiver of site S1 to active transmitters of each of the other sites participating in the call.

The multisite switch 200 retains a map(s) of the mobile units as they are logged into each site area. When a mobile unit, e.g. UNIT 1, sends a log-in message that is passed by a first site to the multisite switch, the switch notes on its site map(s) for the first site that UNIT 1 is logged in and removes UNIT 1 from a second site in which the UNIT 1 had been previously logged. Accordingly, the multisite switch monitors the location of each mobile unit by updating its site maps with log-in messages transmitted by mobile units as they enter a new site area. The multisite switch sends a logged-out message to the second site radio repeater so that repeater can update its data memory and note that UNIT 1 has left its site area.

Figure 2:
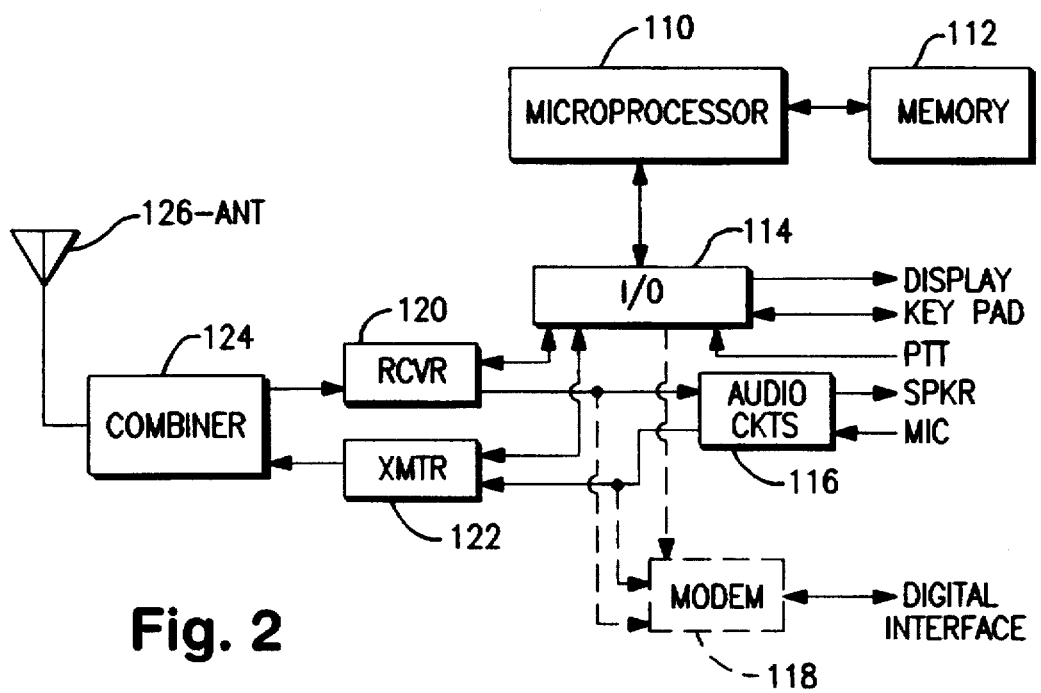
FIG. 2 is a block diagram of an exemplary mobile unit shown in FIG. 1.

FIG. 2 shows the general architecture of a suitable mobile/portable radio unit for use within the extended trunk radio communication's network within accordance with the present invention is now described in conjunction with 2. Microprocessor 110 is provided with suitable memory 112 and input/output circuits 114 so as to interface with the radio unit display, keypad, push-to-talk (PTT) switch as well as audio circuits 116 which provide basic analog audio outputs to the speaker and accept audio inputs from the microphone. Auxiliary control over a modem 118 as a digital interface (e.g. to voice encryption, vehicle location, or other types of digital communication sub-systems) may also be provided if desired. Of course, the I/O circuits 114 also permit suitable programmed control over RF receiver 120 and transmitter 122 which, via conventional signal combiner 124, permit two-way, fully duplex communication over a common antenna 126 as will be appreciated by those skilled in the art.

The memory 112 in each mobile radio stores executable program(s) that enable the radio to respond to control messages received from a site repeater station and to send control messages. e.g., a channel request, to a site repeater station. Of particular interest to the current invention, the program stored in memory 112 includes process steps to cause the mobile radio to: scan for a new control channel being broadcast by a site repeater station when the radio loses reception of a control channel, such as when the mobile radio moves out of a site area for the site station to which the radio is assigned; send a login message when the radio latches onto a new control channel and receives a site station identification message from a new site; send a working channel request message on the control frequency for the site repeater station to which the radio is currently assigned, and respond to a polling message, e.g. a radio enable message, received from a site station by sending a message back to the site station identifying the radio. In addition, the memory 112 will temporarily store information regarding the control and working channels of the site station to which the mobile radio is currently assigned, other information regarding the configuration of the repeater transceivers of the site station, and information regarding the configuration of the mobile radio, e.g., the radio groups to which the radio is assigned to participate.

Figure 3:
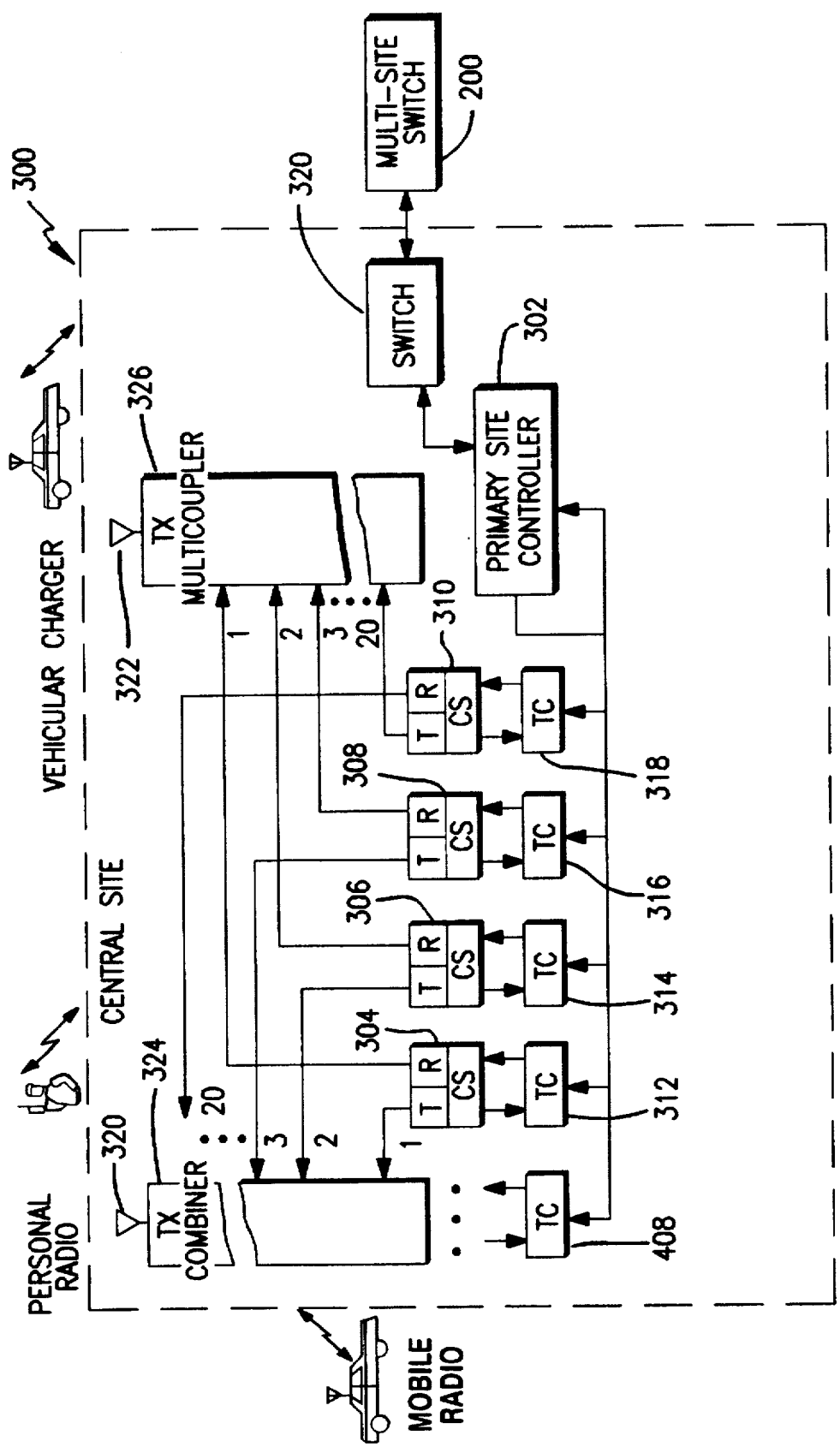
FIG. 3 is a block diagram of an exemplary site controller, e.g., 102A, shown in FIG. 1.

FIG. 3 shows an exemplary general architecture of a suitable radio repeater site 300, e.g., a site S1 102A in FIG. 1, having one or more repeating transceivers and a site controller for use within the extended trunk radio communication's network. A radio repeater site 300 includes a site controller 302, and individual repeater channel transceivers 304, 306, 308, 310. Each transceiver includes circuitry for RF transmission (T), and reception (R), which are both connected to a control shelf (CS) microprocessor based controller. The site controller 302 is preferably a digital computer that oversees the general operation of the repeater site 300 and communicates with the multisite switch 200. In particular, the site controller 302 controls the repeater site by sending and receiving digital signals to and from trunking cards (TC) 312, 314, 316 and 318, where each trunking card is operatively connected to the control shelf processors of each of the individual channel transceiver 304-310. A more detailed description of an exemplary repeater site 300 is contained in commonly-owned U.S. Pat. No. 5,212,724, which is incorporated by reference.

The site controller 302 includes memory that stores executable instructions for the operation of the site repeater station. Of particular interest to the current invention, these executable instructions include process steps to: assign a working channel in response to a working channel request from a mobile radio or multisite switch, regularly send a site identification message on the control channel for the site; log in a new mobile radio upon receipt of a login message from a mobile radio unit; log off a mobile radio in response to a log off message from the multisite switch; transmit a poll message, e.g., a radio enable message that identifies a particular radio to respond to the message (the poll message is sent in response to a poll message received from the multisite switch), and a poll response message sent to the multisite switch when a mobile radio responds to a poll message.

Figure 4:
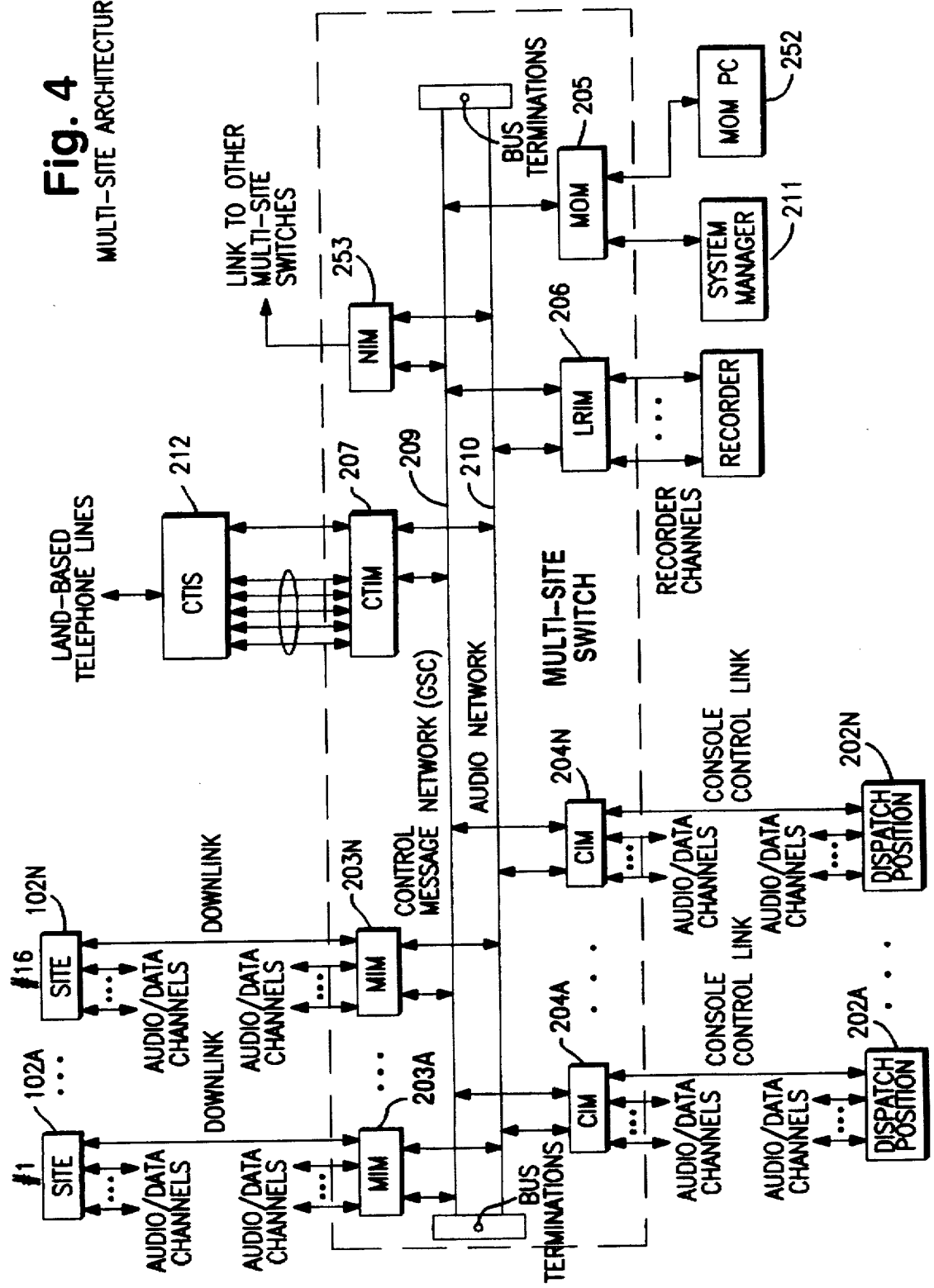
FIG. 4 is a block diagram of an exemplary multisite switch.

Communications between sites are conducted through the multisite switch 200 shown in FIGS. 1 and 4. The multisite switch communicates with the site controllers 102(A to N) in each site and the dispatcher consoles 202(A to N). There are both data and audio communication lines between the multisite switch and each site controller and dispatcher console. The primary responsibility of the multisite switch is to establish and remove audio and data connections among the audio channels connected to it.

The multisite switch comprises a local area network of nodes. As shown in FIG. 4, the nodes are labeled corresponding to whether they interface with a site controller, dispatcher console or other system component. For example, MIMs 203 (A to N) are nodes in the switch that interface with site controllers and CIMs 204 (A to N) are nodes that interface with dispatcher consoles. There are other nodes such as a Monitor Module (MOM) 205, a Recorder Interface Module (RIM) 206, Conventional Interface Module (CVIM) 207 and Switch Interconnect Module (SWIM) 208.

The MOM 205 is the interface for the system manager 211 and the MOM PC (personal computer) 252. The system manager updates the databases in all of the nodes. The MOM PC and MOM maintain certain centralized databases and execute certain programs, such as to poll the sites to locate a mobile radio that is attempting to log into two or more sites.

The RIM 206 interfaces audio recorders to the switch. Recorders are assigned to record calls for various groups or units. The CVIM 207 functions much the same as a MIM but is coupled to telephone lines and standard base stations whereas the MIMs are coupled to site controllers for digital trunked radio systems. The conventional interface adapter (CIA) 212 is merely an interface between the CVIM and the telephone lines and base stations. Similarly, the SWIM interfaces the switch with telephone lines.

Each node in the multisite switch is supported by a microprocessor controlled communications card. All of the cards for the MIMs, CIMs, CVIM, MOM, RIM and SWIM have the same hardware and are interchangeable. The cards have different personalities to indicate that they are assigned to, for example, a site controller or a dispatcher console (dispatch position). Each card can be easily configured to be a MIM, CIM, etc., by setting a few switches on the card. Thus, the cards are truly interchangeable.

The nodes of the switch are each connected to a digital message bus 209 and a digital audio bus 210. The message bus 209 may be a message network using an Intel 80C152 Global Serial Channel (GSC) microprocessor. The message network is a high speed data bus that resides in the GSC microprocessor. The audio bus 210, in the present embodiment, comprises 32 time division multiplexed buses. Each bus contains 32 slots that each carry a single audio channel. A maximum of 1024 audio slots may be routed through the switch (32 buses×32 slots). The audio slots are assigned by the MOM to specific nodes, e.g., MIMs and CIMs, when the switch is enabled.

Figure 5:
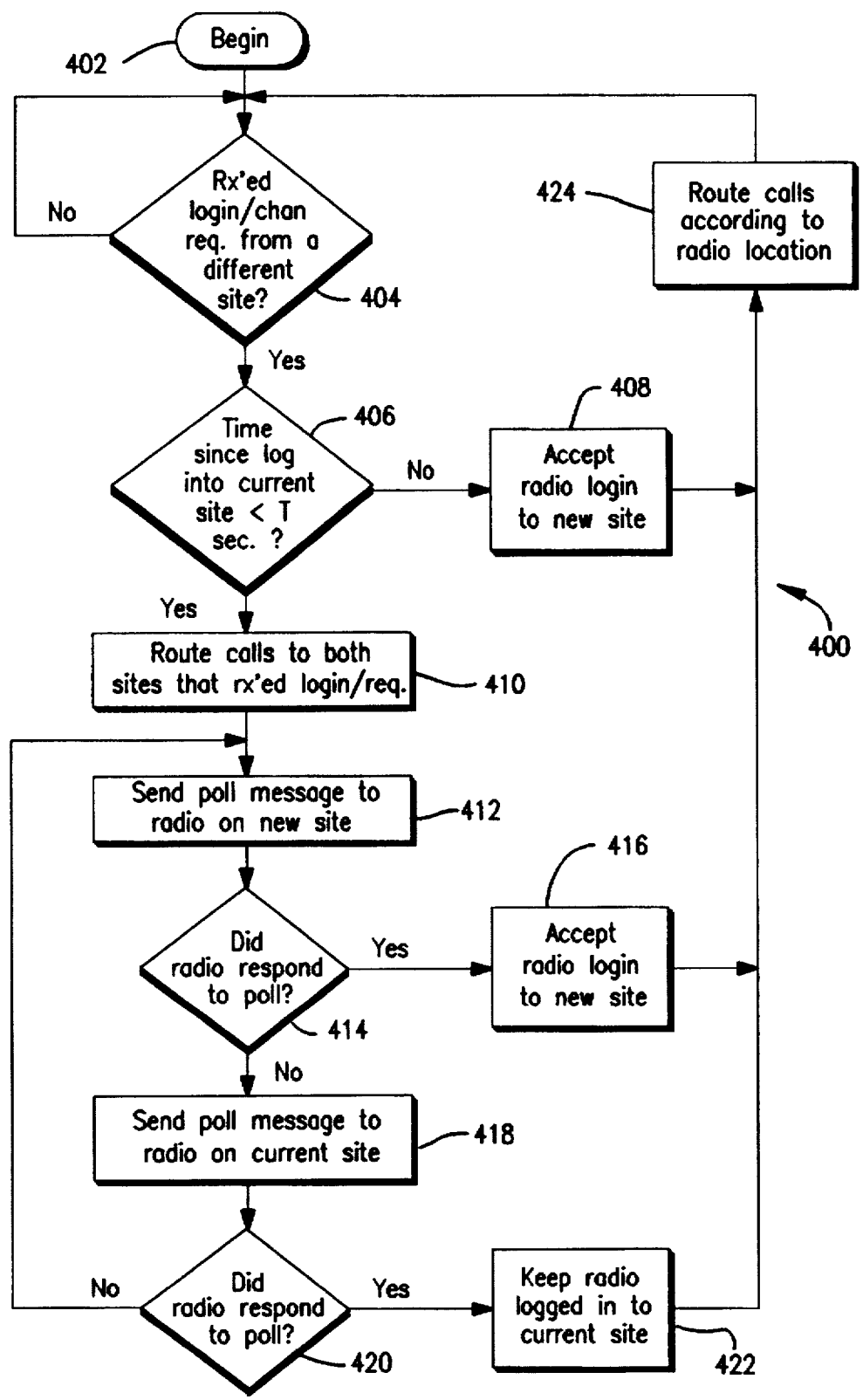
FIG. 5 is a flow chart showing the error correction instructions executed by the site controller and mobile unit.

FIG. 5 shows a flow chart for executable instructions by a processor in the multisite switch and/or the MOM PC (collectively referred to as the switch) that controls the operation of the switch. In step 402, an exemplary program 400 for polling sites to determine the location of a particular mobile radio waits for a login message or a channel request message. Upon receipt of a mobile radio login message or a channel request message, the switch determines whether the message is received from a site controller different from the site in which the mobile radio unit is currently logged, step 404. The multisite switch MOM maintains a list of which radios are logged into which radio repeater sites. Accordingly, the switch knows when a channel request received by a site repeater station is from a mobile radio unit not logged in with that site repeater. If the message is from a mobile radio logged into the site that received the message, then the program 400 returns to its wait state.

If the message is received by a site in which the mobile radio is not logged, then the program operates under a dual site broadcast condition for a prescribed time period (T), step 406, during which communications are broadcast from both the site in which the mobile unit is currently logged and the site that received the login or channel request message. An exemplary time period (T) is 8 seconds (sec.) and may be less than 1 sec. If no other site (including the site into which the mobile radio is currently logged) receives the channel request or login message from the mobile radio, then the radio is logged into the new site and logged out of all other sites by the multisite switch, step 408. In addition, the dual broadcast condition of step 406 is terminated when the radio is logged out of its former site.

If a second (or third, etc.) site reports to the multisite switch that it received the channel request or login message from the mobile unit within the prescribed time (T), then the multisite switch temporarily routes all communications (voice, data, control messages) to the mobile radio unit to the site repeater stations that received the channel request or login message (including the site into which the mobile radio is currently logged, if that site received the channel request or login message from the mobile radio unit), step 410. This temporary routing of calls intended for one mobile radio to two or more sites is conducted until the actual site location for the mobile radio is determined and the radio is properly logged into that site.

In addition, the program 400 causes the switch to sequentially send poll message commands to each of the site repeater stations that received the channel request or login message from the single mobile radio unit, step 412. For example, the new site (the first site receiving the channel request or login message that does not have the mobile radio unit logged into its site area) is sent a poll message command (which is actuality may be a radio enable message command) by the multisite switch. The new site transmits a poll message that identifies the mobile unit that is to respond to the message. If the new site receives a response from the mobile unit, the site sends a poll response message to the multisite switch, step 414, and the mobile radio is logged into the new site, step 416. Once the mobile radio is logged in the new site, the temporary transmission of communications to that mobile radio unit from two or more sites is stopped. Communications for the mobile radio are transmitted only from the new site, at least until the mobile radio moves out of the new site and logs into another site.

If the new site does not receive a response from the mobile unit after transmitting a poll message, the switch sends a poll message common to the site onto which the mobile radio unit is currently logged, in step 418. If that site receives a response to its poll message from the mobile radio unit (step 420), then the mobile radio continues to be logged into its existing site, step 422, the temporary dual path routing of communications to that mobile radio is stopped, and calls are routed to the radio in accordance with the site in which the radio is logged, step 424. Similarly, if other sites reported to the switch that they had received the channel request or login message from the mobile unit, then the switch may also sequentially command those other sites to issue a poll message. The first site receiving a response from the mobile unit to that site's poll message will log the unit into its site area.

If none of the site repeater stations that received the channel request or login message from the mobile radio receives a response from the mobile radio unit to its poll message, then the sequential transmission of poll message is repeated, step 420. As a mobile unit moves about it may temporarily be shielded from receiving transmissions from any site repeater station. By repeating the sequential transmission of polling messages will normally successfully locate the mobile radio unit. In addition, the mobile radio unit is either latched onto a control channel of some site or scanning for a new control channel. If the radio is latched onto a control channel, then it should receive any poll message transmitted on that control channel. If the mobile radio is scanning for a new control channel, then the radio will latch onto a control channel and send a new login message on that control channel which will restart program 400. Accordingly, it is unlikely that any mobile radio will not ultimately be located by the polling technique embodied in program 400. If a unit is not located, the program may have a timeout feature that reports to a multisite network supervisor, e.g., the system controller, that a mobile radio cannot be located.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for polling and locating a mobile radio unit in a multisite network of radio frequency (RF) repeater sites linked by a multisite switch comprising:
   (a) logging the mobile radio unit into an initial site of said RF repeater sites;
   (b) transmitting a message from the mobile radio unit that is received by two or more sites of said RF repeater sites;
   (c) a first site of the two or more sites receiving the message transmitted in step (b) and sending a login request or channel request to the multisite switch, where the first site is other than the initial site;
   (d) if a second site of the two or more sites sends a second login request or channel request to the multisite switch within a predetermined period, sending a poll message command from the multisite switch to the first site;
   (e) transmitting a first site poll message from the first site to the mobile radio, without transmitting a poll message from other repeater sites;
   (f) logging the mobile radio in the first site, if the mobile radio transmits a response to the first site poll message that is received by the first site;
   (g) if the mobile radio does not transmit a response to the poll message that is received by the first site, sending a poll message command to the second site and transmitting from the second site a second site poll message to the mobile radio, without transmitting a poll message from other repeater sites, and
   (h) upon receipt of a response to the second site poll message, logging the mobile radio into the second site.

2. A method for polling and locating a mobile radio unit as claimed in claim 1 in a multisite network where the second site is the initial site and in step (h) the logging of the mobile radio into the second site is performed in step (a).

3. A method for polling and locating a mobile radio unit in a multisite network as claimed in claim 1 wherein steps (f) and (h) further include logging the mobile radio out of other sites.

4. A method for polling and locating a mobile radio unit in a multisite network as claimed in claim 1 wherein step (f) further include logging the mobile radio out of the initial site.

5. A method for polling and locating a mobile radio unit in a multisite network as claimed in claim 1 further comprising the step (i) of transmitting communications to the mobile radio from both the first and second sites until the mobile radio is logged into either the first or second site in steps (f) and (h).

6. A method for polling and locating a mobile radio unit in a multisite network as claimed in claim 1 wherein in step (d) the predetermined period is less than 5 seconds.

7. A method for polling and locating a mobile radio unit in a multisite network as claimed in claim 1 wherein steps (e) through (h) are repeated at least two times.

8. A method for polling and locating a mobile radio unit in a multisite network as claimed in claim 1 wherein the poll messages in steps (e) and (g) are radio enable messages.

* * * * *